United States Patent
Kim et al.

(10) Patent No.: US 6,452,703 B1
(45) Date of Patent: Sep. 17, 2002

(54) OPTICAL ADD-DROP MULTIPLEXING TECHNIQUE AND WAVELENGTH DIVISION MULTIPLEXING OPTICAL LINK USING SUCH A MULTIPLEXING TECHNIQUE

(75) Inventors: Sung-jun Kim, Pyeongtaek; Jeong-mee Kim, Yongin, both of (KR)

(73) Assignee: Samsung Electronics, Co., Ltd., Suwon (KR)

(*) Notice: Subject to any disclaimer, the term of this patent is extended or adjusted under 35 U.S.C. 154(b) by 0 days.

(21) Appl. No.: 09/365,249

(22) Filed: Jul. 30, 1999

(30) Foreign Application Priority Data

Aug. 4, 1998 (KR) .............................. 98-31701

(51) Int. Cl.[7] .............................................. H04J 14/02
(52) U.S. Cl. ........................................ 359/124; 359/119
(58) Field of Search ................................ 359/124, 118, 359/119

(56) References Cited

U.S. PATENT DOCUMENTS

| | | | | |
|---|---|---|---|---|
| 5,566,014 A | * | 10/1996 | Glance | ......................... 359/124 |
| 5,774,606 A | | 6/1998 | de Barros et al. | |
| 5,861,967 A | * | 1/1999 | Mizuochi et al. | ........... 359/130 |
| 6,069,719 A | * | 5/2000 | Mizrahi | ....................... 359/124 |
| 6,288,810 B1 | * | 9/2001 | Grasso et al. | ................ 359/127 |

FOREIGN PATENT DOCUMENTS

| | | | |
|---|---|---|---|
| GB | 2 305 041 A | | 3/1997 |
| GB | 2 315 380 A | | 1/1998 |
| GB | 2340326 A | * | 2/2000 |
| JP | 3-6137 | | 1/1991 |
| WO | 98/05133 | | 2/1998 |
| WO | 99/07097 | | 2/1999 |

OTHER PUBLICATIONS

Korean Office Action issued by the Korean Patent Office dated Jan. 31, 2001.

* cited by examiner

Primary Examiner—Thomas Mullen
(74) Attorney, Agent, or Firm—Robert E. Bushnell, Esq.

(57) ABSTRACT

An optical add-drop multiplexer (OADM) for adding and dropping wavelength groups for each node among multiplexed and input wavelength groups includes: a wavelength group demultiplexer for separating a plurality of input channels into groups of channels and dropping a channel group required for the node and passing the other groups of channels therethrough; a channel selector for selecting channels from the wavelength group output from the wavelength group demultiplexer and transmitting the selected channels to the area; a channel multiplexer for multiplexing the channels having the same wavelengths as those of the selected channels and input from the area into the wavelength group, and a wavelength group multiplexer for adding the wavelength group input from the channel multiplexer to the wavelength groups that have passed through the wavelength group demultiplexer. Wavelengths required for each node are set to a wavelength group, thereby reducing the time necessary in extending channel capacity or wavelengths in each node. Also, since only a channel selector is additionally installed in an OADM for wavelength extension, wavelength extension is facilitated and a WDM system can be constructed at a low cost. Such an OADM may be used in a wavelength division multiplexing (WDM) optical link.

9 Claims, 3 Drawing Sheets

OPTICAL ADD-DROP MULTIPLEXING TECHNIQUE AND WAVELENGTH DIVISION MULTIPLEXING OPTICAL LINK USING SUCH A MULTIPLEXING TECHNIQUE

CLAIM OF PRIORITY

This application makes reference to, incorporates the same herein, and claims all benefits accruing under 35 U.S.C. §119 from my application OPTICAL ADD-DROP MULTIPLEXER AND WAVELENGTH DIVISION MULTIPLEXING OPTICAL LINK USING THE SAME filed with the Korean Industrial Property Office on Aug. 4, 1998 and there duly assigned Serial No. 31701/1998.

BACKGROUND OF THE INVENTION

1. Field of the Invention

The present invention relates to an optical add-drop multiplexing technique and a wavelength division multiplexing (WDM) optical link including such a multiplexing technique, and more particularly, to an optical add-drop multiplexer (OADM) for adding and dropping wavelength groups among multiplexed and input wavelength groups for each of a plurality of nodes, and a WDM optical link including such a multiplexer.

2. Description of the Related Art

Earlier WDM optical links using an OADM selectively drop wavelengths to each of a plurality of nodes (dropped channels), and pass the other wavelengths (pass channels). The optical signals of dropped channels are transmitted to the local areas covered by a node for each of the channels. Also, the optical signals transmitted from the local areas are supplied to an optical receiver which converts them into electrical signals. The electrical signals which are included in some new data are converted into optical signals having the same wavelengths as those of the dropped channels and then added to the pass channels by an optical multiplexer. The nodes output optical signals which have the same number of channels as the number of channels input thereto and the same wavelengths as those of the input channels.

Such an OADM includes a wavelength division demultiplexer (DMUX) for demultiplexing and a wavelength division multiplexer (MUX) for multiplexing. The OADM operates as follows. If sixteen channel wavelengths are multiplexed and input to the DMUX, the DMUX demultiplexes sixteen channels and drops four channels to be transmitted to the local areas covered and allows the other channels to pass therethrough. The MUX multiplexes the four channels input from the local areas and the pass channels.

When such an OADM is used, one or more new wavelengths are provided to a node in response to a request from the node. An apparatus required for wavelength extension in the abovenoted OADM includes a 2-channel separator, a first DMUX, a first MUX, a second DMUX, a second MUX, and a 2-channel coupler. The first DMUX and the first MUX drop and add respectively four channels among sixteen channels for a node. In the case of extending channels for the node, the 2-channel separator, the second DMUX, the second MUX, and the 2-channel coupler must be further provided. In other words, the 2-channel separator separates the input channels into a group of sixteen channels in use and another group of channels including the channels to be extended. The second DMUX and the second MUX drop and add respectively the channels to be extended from and to the other group of channels. The 2-channel coupler couples the group of sixteen channels and the other group of channels and transmits them to the next node.

However, the OADM discussed above requires an additional DMUX and MUX for securing the capacity of new channels and extending wavelengths. To this end, it is necessary to acquire a system operators' permission. Service providers can use the channels only when the system operators hand over the channels to them. Thus, channel capacity and wavelength extension is a costly and time-consuming work.

SUMMARY OF THE INVENTION

To solve the above problems, it is an object of the present invention is to provide an optical add-drop multiplexer (OADM) for binding wavelengths required by each node into one wavelength group, dropping the wavelength group from the multiplexed input wavelength groups, selecting channels from the wavelength group and adding the wavelength group to the wavelength groups, and a WDM optical link having such an OADM.

Accordingly, to achieve the above object, there is provided an OADM for dropping channels for a predetermined area covered by an optical node and adding input channels from the area to be transmitted to a next optical node, the OADM including: a wavelength group demultiplexer for separating a plurality of input channels into groups of channels and dropping a channel group required for the node and passing the other groups of channels therethrough; a channel selector for selecting channels from the wavelength group output from the wavelength group demultiplexer and transmitting the selected channels to the area; a channel multiplexer for multiplexing the channels having the same wavelengths as those of the selected channels and input from the area into the wavelength group, and a wavelength group multiplexer for adding the wavelength group input from the channel multiplexer to the wavelength groups that have passed through the wavelength group demultiplexer.

According to another aspect of the present invention, there is provided a wavelength division multiplexing (WDM) optical link having a plurality of optical nodes connected to each other through optical fibers, each node including an optical add-drop multiplexer (OADM) for dropping channels required for a predetermined area covered by each node and adding input channels from the area to be transmitted to a next optical node, wherein the OADM includes: a wavelength group demultiplexer for separating a plurality of input channels into groups of channels and dropping a channel group required for the node and passing the other group of channels therethrough; a channel selector for selecting channels from the wavelength group output from the wavelength group demultiplexer and transmitting the selected channels to the area; a channel multiplexer for multiplexing the channels having the same wavelengths as those of the selected channels and input from the area into the wavelength group, and a wavelength group multiplexer for adding the wavelength groups input from the channel multiplexer to the wavelength groups that have passed through the wavelength group demultiplexer.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1A:
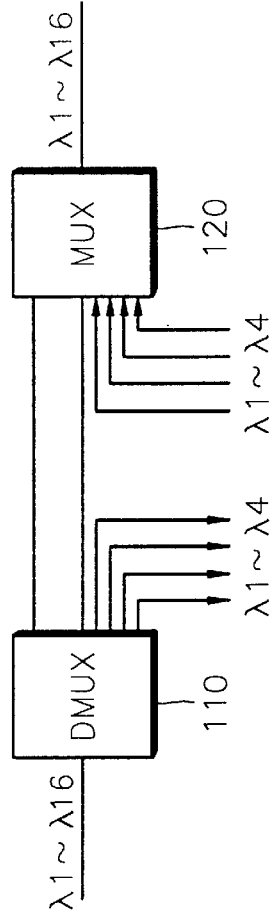
FIG. 1A is a block diagram illustrating an OADM.

FIG. 1A is a block diagram of an OADM as discussed in the Background of the Invention above. The OADM shown in FIG. 1A includes a wavelength division demultiplexer (DMUX) 110 for demultiplexing and a wavelength division multiplexer (MUX) 120 for multiplexing. The DMUX 110 and the MUX 120 each includes arrayed wavelength gratings. The OADM operates as follows. If 16 channel wavelengths $\lambda 1$ through $\lambda 16$ are multiplexed and input to the DMUX 110, the DMUX 110 demultiplexes 16 channels and drops four channels ($\lambda 1$ through $\lambda 4$) to be transmitted to the local areas covered, and allows the other channels to pass therethrough. The MUX 120 multiplexes the four channels $\lambda 1$ through $\lambda 4$ input from the local areas and the pass channels.

Figure 1B:
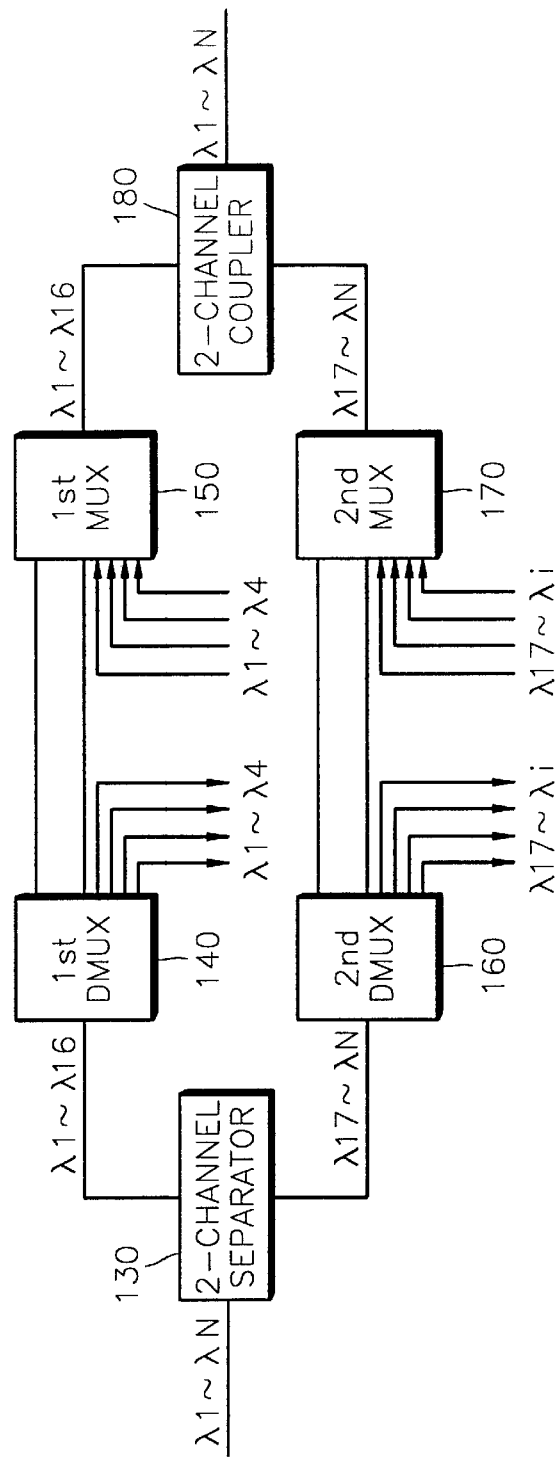
FIG. 1B is a block diagram illustrating an apparatus required for wavelength extension in the OADM shown in FIG. 1A.

When such an OADM is used, one or more new wavelengths are provided to a node in response to a request from the node. FIG. 1B is a block diagram illustrating an apparatus required for wavelength extension in the OADM shown in FIG. 1, the apparatus including a 2-channel separator 130, a first DMUX 140, a first MUX 150, a second DMUX 160, a second MUX 170 and a 2-channel coupler 180. The first DMUX 140 and the first MUX 150 drop and add, respectively, four channels ($\lambda 1$ through $\lambda 4$) among 16 channels $\lambda 1$ through $\lambda 16$, for a node, as shown in FIG. 1A. In the case of extending channels for the node, the 2-channel separator 130, the second DMUX 160, the second MUX 170 and the 2-channel coupler 180 must be further provided. In other words, the 2-channel separator 130 separates N input channels into a group of 16 channels $\lambda 1$ through $\lambda 16$ in use and another group of channels $\lambda 17$ through $\lambda N$ including the channels to be extended. The second DMUX 160 and the second MUX 170 drop and add, respectively, the channels to be extended ($\lambda 17$ through $\lambda i$) from and to the other group of channels $\lambda 17$ through $\lambda N$. The 2-channel coupler 180 couples the group of 16 channels $\lambda 1$ through $\lambda 16$ and the other group of channels $\lambda 17$ through $\lambda N$ and transmits them to the next node.

Figure 2A:
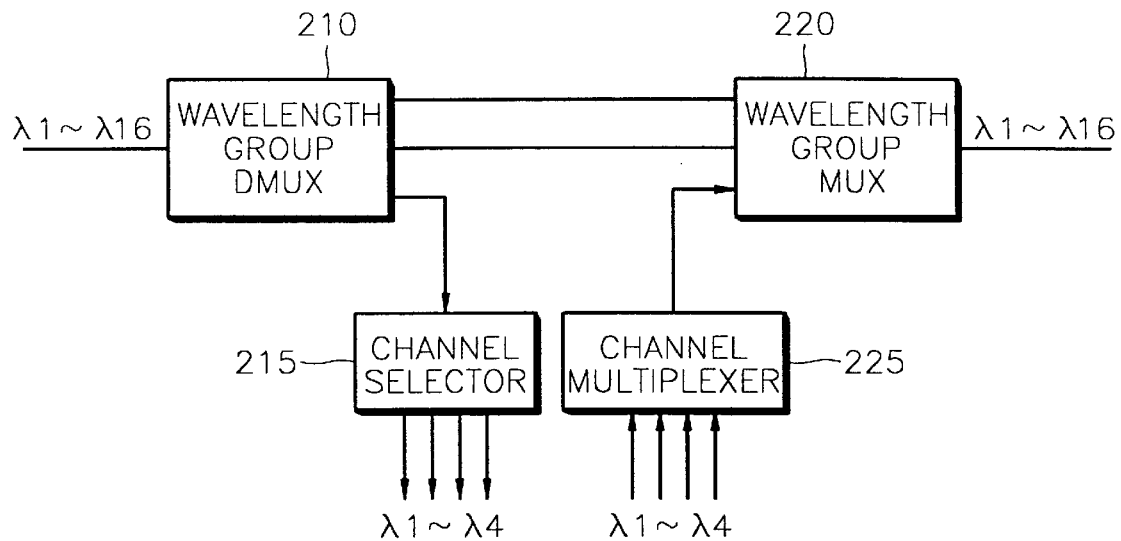
FIG. 2A is a block diagram illustrating an OADM according to the present invention.

Referring to FIG. 2A, the OADM includes a wavelength group DMUX 210, a wavelength group MUX 220, a channel selector 215 and a channel multiplexer 225. The OADM operates as follows.

First, the wavelength group DMUX 210 demultiplexes a plurality of input channels, for example, 16 channels $\lambda 1$ through $\lambda 16$, into wavelength groups, each wavelength group consisting of several wavelengths, drops one of the wavelength groups and allows the other groups to pass therethrough. The channel selector 215 selects channels from the dropped wavelength group and transmits the selected channels to the area covered by the channels. The channel multiplexer 225 multiplexes optical signals input from the covered areas of wavelengths which are the same as those of the dropped channels. The wavelength group MUX 220 adds the wavelength group multiplexed in the channel multiplexer 225 to the wavelength groups that have passed through the wavelength if group DMUX 210.

Figure 2B:
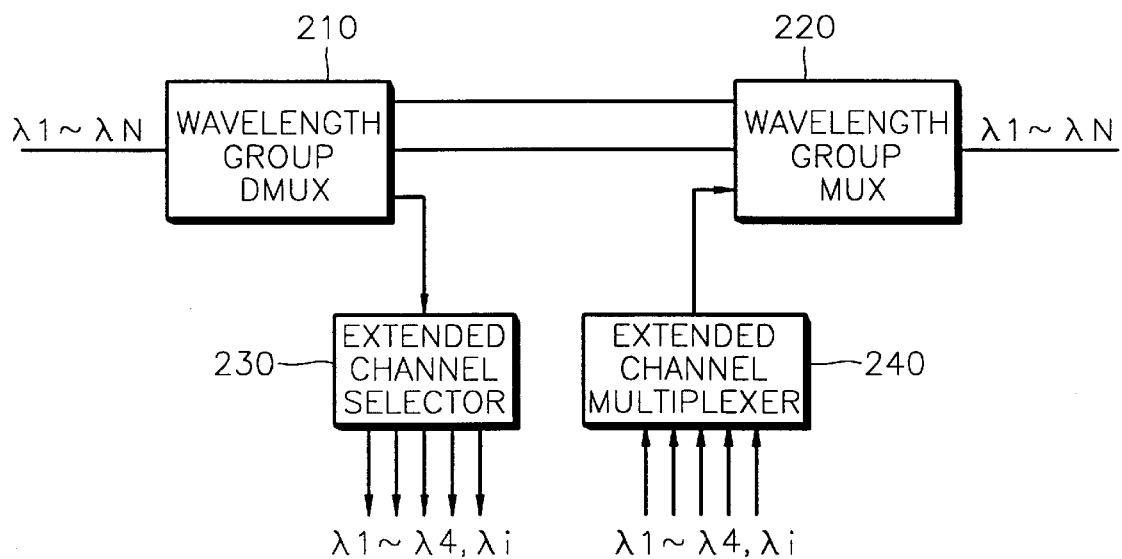
FIG. 2B is a block diagram illustrating an apparatus required for wavelength extension in the OADM shown in FIG. 2A.

FIG. 2B is a block diagram illustrating an apparatus required for wavelength extension in the OADM shown in FIG. 2A. The apparatus shown in FIG. 2B includes a wavelength group DMUX 210, a wavelength group MUX 220, an extended channel selector 230 and an extended channel multiplexer 240. The wavelength group DMUX 210 passes groups of wavelengths which are not required for each node among N input channels, and drops a group of wavelengths required for each node. The dropped wavelength group includes extended wavelengths. The extended channel selector 230 selects separate wavelengths from the dropped wavelength group which are transmitted to the areas covered by the respective channels. The extended channel selector 230 further includes an extended channel separator for separating channels $\lambda i$ to be extended, in addition to the channel selector 215 shown in FIG. 2A.

The extended channel multiplexer 240 multiplexes optical signals input from the covered areas which have wavelengths which are the same as those of the channels selected in the extended channel selector 230 into the wavelength group. The wavelength group MUX 220 adds the wavelength group multiplexed in the extended channel multiplexer 240 to the wavelength groups that have passed through the wavelength group DMUX 210 and transfers them to the next node.

Figure 3:
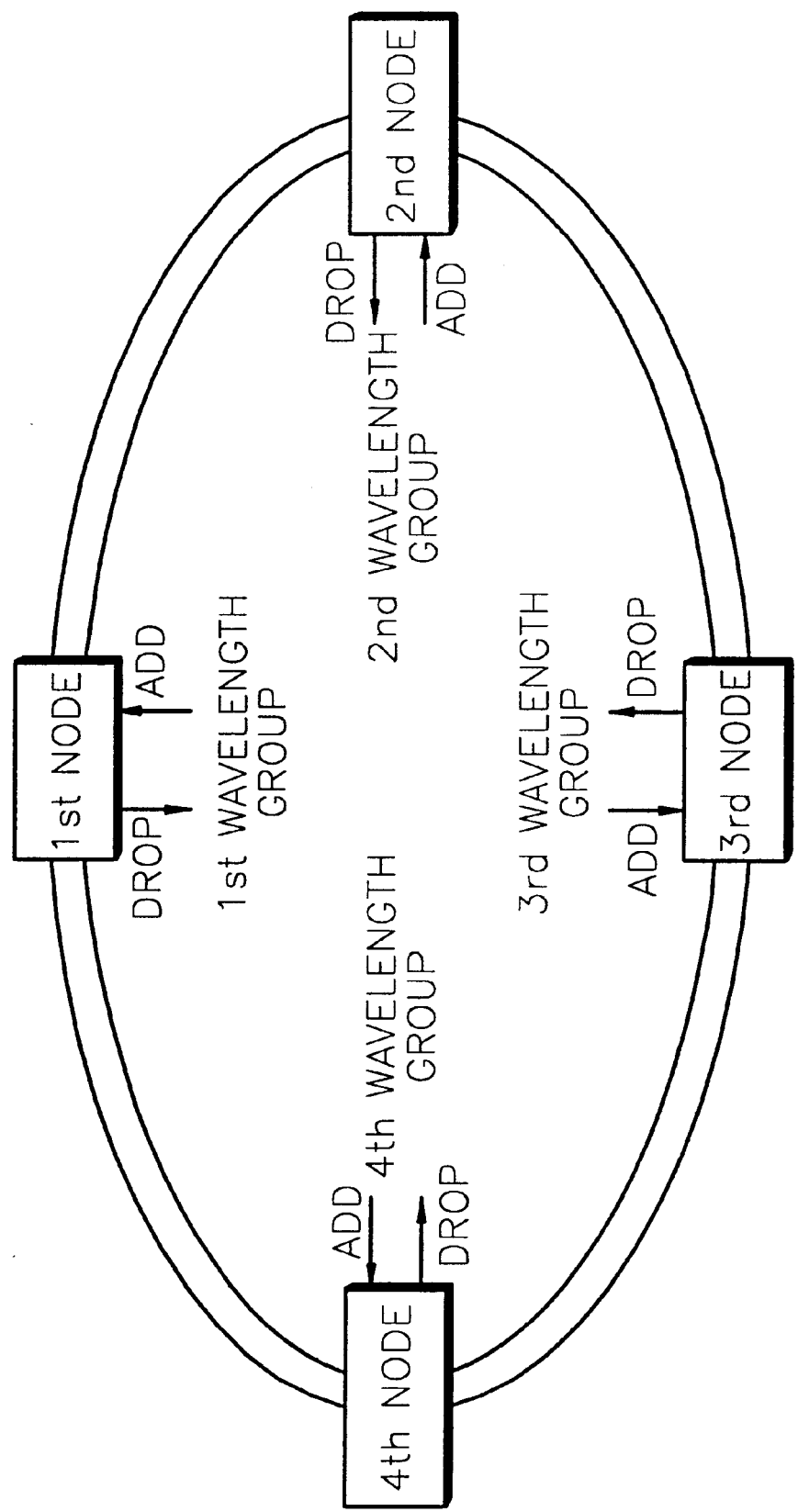
FIG. 3 is a schematic diagram illustrating a WDM optical link having nodes with OADMs of the present invention connected to each other through optical transmission fibers.

FIG. 3 is a schematic diagram of a WDM optical link having nodes with the OADM of the present invention connected to each other through optical transmission fibers. Nodes having a wavelength group can use a plurality of wavelengths in a given wavelength group and the number of wavelengths used by the nodes and the transmission capacity thereof are determined in accordance with quality and quantity of service rendered. For example, N wavelengths output from a fourth node are input to a first node through an optical fiber transmission line, and the first node drops a first wavelength group. The dropped first wavelength group is separated into the respective wavelengths. Also, in the first node, a plurality of wavelengths are multiplexed into a first wavelength group which is then added to second, third and fourth wavelength groups to then be transmitted to a second node. The OADM included in each node is shown in FIGS. 2A and 2B, and the operation thereof is as described above.

According to the present invention, wavelengths required for each node are combined into a wavelength group, thereby reducing the time necessary in extending channel capacity or wavelengths in each node. Also, since only a channel selector is additionally installed in an OADM for wavelength extension, wavelength extension is facilitated and a WDM system can be constructed at a low cost. Further, in the case where a wavelength group consists of four channels, an optical demultiplexer/multiplexer capable of adding/dropping four wavelength groups is used, instead of an optical demultiplexer/multiplexer having a 16-channel function, thereby reducing an insertion loss which occurs when an optical signal passes through an optical element, thereby improving the performance of the WDM system.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An optical add-drop multiplexer (OADM) for dropping channels for a predetermined area covered by an optical node and for adding input channels from the area to be transmitted to a next optical node, the OADM comprising:
- a wavelength group demultiplexer for separating a plurality of input channels into groups of channels and dropping a channel group required for the node and passing the other groups of channels therethrough;
- a channel selector for selecting channels from the wavelength group output from the wavelength group demultiplexer and transmitting the selected channels to the area;
- a channel multiplexer for multiplexing the channels having the same wavelengths as those of the selected channels and input from the area into the wavelength group; and
- a wavelength group multiplexer for adding the wavelength group input from the channel multiplexer to the wavelength groups that have passed through the wavelength group demultiplexer.

2. The OADM according to claim 1, the channel selector further comprising an extended channel separator for separating channels to be extended from the wavelength group, when channels are to be extended in the node.

3. The OADM according to claim 2, the channel multiplexer multiplexing the channels having the same wavelengths as those of the channels separated by the extended channel separator and input from the area.

4. A wavelength division multiplexing (WDM) optical link having a plurality of optical nodes connected to each other through optical fibers, each node including an optical add-drop multiplexer (OADM) for dropping channels required for a predetermined area covered by each node and for adding input channels from the area to be transmitted to a next optical node, the OADM comprising:
- a wavelength group demultiplexer for separating a plurality of input channels into groups of channels and dropping a channel group required for the node and passing the other group of channels therethrough;
- a channel selector for selecting channels from the wavelength group output from the wavelength group demultiplexer and transmitting the selected channels to the area;
- a channel multiplexer for multiplexing the channels having the same wavelengths as those of the selected channels and input from the area into the wavelength group; and
- a wavelength group multiplexer for adding the wavelength groups input from the channel multiplexer to the wavelength groups that have passed through the wavelength group demultiplexer.

5. The WDM optical link according to claim 4, the channel selector further comprising an extended channel separator for separating channels to be extended from the wavelength group, when channels are to be extended in the node.

6. The WDM optical link according to claim 5, the channel multiplexer multiplexing the channels having the same wavelengths as those of the channels separated by the extended channel separator and input from the area.

7. A method of dropping channels for a predetermined area covered by an optical node and for adding input channels from the area to be transmitted to a next optical node in an optical add-drop multiplexer (OADM), the method comprising:
- separating a plurality of input channels into groups of channels and dropping a channel group required for the node and passing the other groups of channels therethrough with a wavelength group demultiplexer;
- selecting channels from the wavelength group output from the wavelength group demultiplexer and transmitting the selected channels to the area with a channel selector;
- multiplexing the channels having the same wavelengths as those of the selected channels and input from the area into the wavelength group with a channel multiplexer; and
- adding the wavelength group input from the channel multiplexer to the wavelength groups that have passed through the wavelength group demultiplexer with a wavelength group multiplexer.

8. The method according to claim 7, further comprising the step of separating channels to be extended from the wavelength group, when channels are to be extended in the node with an extended channel separator.

9. The method according to claim 8, further comprising the step of multiplexing the channels having the same wavelengths as those of the channels separated by the extended channel separator and input from the area.

* * * * *